United States Patent Office 3,057,752
Patented Oct. 9, 1962

3,057,752
PROCESS FOR COATING FLEXIBLE, NON-FIBROUS ORGANIC SUBSTRATES WITH AN AGED AQUEOUS DISPERSION OF PARTICLES OF A COPOLYMER OF VINYLIDENE CHLORIDE
Edward Royals Covington, Richmond, Va., and John Warren Meier, Madison, Tenn., assignors to E. I. du Pont de Nemours and Company, Wilmington, Del., a corporation of Delaware
No Drawing. Filed Dec. 22, 1958, Ser. No. 781,885
5 Claims. (Cl. 117—119.2)

This invention relates to a coating process and more particularly to a process for coating flexible, non-fibrous base sheets with vinylidene chloride copolymers from aqueous dispersions thereof.

Coatings of vinylidene chloride copolymerized with minor amounts of other mono-olefinic monomers copolymerizable therewith are notable for their toughness, flexibility, strength, transparency, heat-sealability, inherent moisture-proofness, etc. and have heretofore been recommended as protective coatings for a variety of flexible base sheets, particularly non-fibrous base sheets such as films of regenerated cellulose, polyethylene terephthalate, polyvinyl chloride, polyvinyl alcohol, cellulose acetate, etc. Copoymers of vinylidene chloride of the character above described are readily prepared in the form of aqueous dispersions which may be advantageously applied as such to the flexible base sheet to form on such sheet a continuous protective coating of the copolymer. In the normal coating procedure, an aqueous dispersion containing a suitable solids content of the vinylidene chloride copolymer is applied to a continuous web of regenerated cellulose film or the like by any of the well known techniques, e.g., dipping, spraying, roller-coating, etc.; the coated film is then passed thru a drying zone where it is subjected to an elevated temperature effective to reduce the moisture content to the desired level, and, after cooling to a temperature at which the coating is no longer tacky to the touch (about 40° C.), the coated film is wound into a roll for storage, shipment and/or further processing such as slitting, printing, etc. A major difficulty encountered in the aqueous dispersion coating method is that in many instances the coated surfaces, although non-tacky to the touch before being wound into a roll, adhere to each other in the roll so tenaciously that film cannot be later unwound from the roll without tearing the coating from the base sheet.

An object of this invention, therefore, is to provide a process for applying to flexible, non-fibrous base sheets a protective coating of a copolymer of vinylidene chloride copolymerized with a minor amount of at least one other mono-olefinic monomer copolymerizable therewith, said coating being applied from an aqueous dispersion of the copolymer, and being free from any tendency to adhere to itself in the roll or stacked sheet state. A more specific object is to provide a continuous process for the coating of continuous regenerated cellulose film with an aqueous dispersion of a copolymer formed by copolymerizing a major amount of vinylidene chloride with a small amount of at least one other mono-olefinic monomer copolymerizable therewith, the resulting coated surfaces being free of a tendency to strongly adhere together in roll or stacked sheet state. These and other objects will more clearly appear from the description which follows.

We have found that in order to obviate the difficulties noted above, three critical conditions must be observed in the coating process, namely: (1) The aqueous dispersion of vinylidene chloride must be aged to within a critical age range before application to the flexible base sheet. This is unexpected since no ageing of organic solvent solutions of the same copolymers is required prior to application, and while the art is replete with information relative to prolonging aqueous dispersions of vinylidene chloride copolymers in condition for coating to produce coalesced coatings, there is no teaching that the dispersions must undergo an initial ageing period. Rather, the implication is that freshly prepared aqueous dispersions may be immediately applied as coatings without adverse effect. (2) The coated sheet must be dried at an elevated temperature to a mosture level of not greater than 14%. (3) The coated sheet after drying must be substantially immediately cooled to a temperature not above 25° C. prior to winding into a roll or stacking. This too is unexpected since the usual practice in the coating art is to cool or condition the sheet to the point where it is no longer tacky before it is wound into a roll. In the case of vinylidene chloride copolymer coated on regenerated cellulose film, the coated surface is seemingly non-tacky at about 40° C.

Therefore the present invention, briefly stated, comprises in sequence the steps of (1) coating a flexible, non-fibrous base sheet, e.g., regenerated cellulose film, with an aqueous dispersion of particles of a vinylidene chloride copolymer of at least 92.5 mol percent vinylidene chloride and at least one other copolymerizable mono-olefinic monomer, said dispersed copolymer particles being in such condition that an infrared absorption band at about 13.3 microns appears within the time period of not less than 6 minutes and not greater than 35 minutes after casting said dispersion into a self-supporting film; (2) heating the coated base material to an elevated temperature effective to coalesce the copolymer into a continuous coating, to dry, i.e., reduce the moisture content of the coated base, to a moisture level not greater than 14%, and to promote crystallization in the coalesced copolymer coating; and (3) substantially immediately cooling the coated base material to a temperature not higher than 25° C. The resulting coated base material may then be wound into a roll or may be stacked in sheet form without causing the contiguous coated surfaces to adhere to each other.

A simplified flow diagram of the process of this invention is as follows:

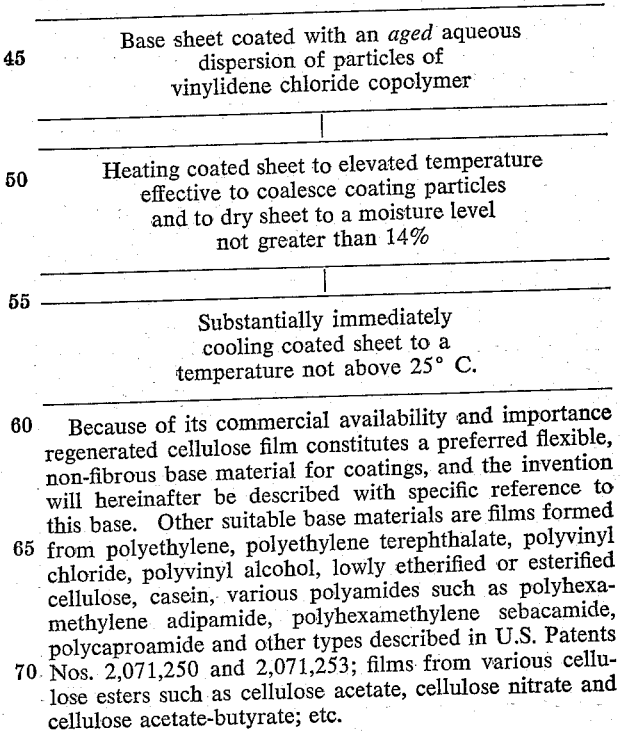

Because of its commercial availability and importance regenerated cellulose film constitutes a preferred flexible, non-fibrous base material for coatings, and the invention will hereinafter be described with specific reference to this base. Other suitable base materials are films formed from polyethylene, polyethylene terephthalate, polyvinyl chloride, polyvinyl alcohol, lowly etherified or esterified cellulose, casein, various polyamides such as polyhexamethylene adipamide, polyhexamethylene sebacamide, polycaproamide and other types described in U.S. Patents Nos. 2,071,250 and 2,071,253; films from various cellulose esters such as cellulose acetate, cellulose nitrate and cellulose acetate-butyrate; etc.

A suitable test for determining whether or not the aqueous dispersions of copolymer are suitable for coating is carried out as follows: A thin film of the dispersion is spread out on silver chloride (or other substrate transparent to infrared in the region of 11 to 14 microns) and is placed in the analytical beam of a Perkin-Elmer Model 21 infrared spectrophotometer. The infrared spectrum of the sample is then scanned at 2 minute time intervals until a slight absorption band develops at about 13.3 microns. The time required for the development of such a band is a function of dispersion age (Journal of Polymer Science, vol. XXII, pp. 95–112 (56)—"Infrared Spectra of High Polymers—No. IV, Polyvinyl Chloride and Polyvinylidene Chloride and Copolymers"—S. Krimm and C. Y. Liang). When the dispersion is in such a condition that the absorption band at about 13.3 microns appears within the time period of not less than 6 minutes and not greater than 35 minutes, satisfactory coalesced coating will be obtained. If the absorption band appears within less than 6 minutes, the copolymer dispersion has passed beyond the age range suitable for coating, and if the band does not appear within 35 minutes, the dispersion has not been sufficiently aged.

Best performance has been noted when the dispersion develops an absorption band within the time range of 25–35 minutes. In general, aqueous dispersions which have been aged 3 days will show an absorption band within the maximum limit of 35 minutes.

Drying of the coated, flexible base material at an elevated temperature should be sufficient to remove the aqueous dispersant to a moisture level of not greater than 14%, and preferably, to about 5½–8%, in the finished coated base. Drying also promotes the crystallization of the coalesced copolymer coating.

Cooling of the dried, coated film to a temperature not greater than 25° C. has been found to be equally important in producing satisfactory films. Even when the period of usefulness of the dispersion and drying conditions were in proper relationship, if the cooling of the film did not meet the above-mentioned requirement, the coated film was unsatisfactory principally because of the sticking or blocking of adjacent layers of the coating in the wound mill rolls or in the stacked sheets.

In order that the coated, flexible base materials may be sufficiently impermeable to moisture vapor, heat sealable and flexible, the copolymer of the aqueous copolymer dispersions should contain at least 92.5 mol percent of the vinylidene chloride. Preferred polymerizable mono-olefinic monomers which may be copolymerized with vinylidene chloride include the alkyl acrylates, such as methyl and ethyl acrylate, acrylonitrile, vinyl chloride, vinyl acetate, methacrylonitrile, ethyl methacrylate, and methyl vinyl ketone. However, the copolymers are not limited to these. Any monomer which will copolymerize with vinylidene chloride may be used. The list includes: methyl, ethyl, isobutyl, butyl, octyl and 2-ethylhexyl acrylates and methacrylates; phenyl methacrylate, cyclohexylmethacrylate, p-cyclohexylphenyl methacrylate, methoxyethyl methacrylate, chloroethyl methacrylate, 2-nitro-2-phenyl propyl methacrylate and the corresponding esters of acrylic acid; methyl alpha-chloroacrylate, octyl alpha-chloroacrylate, methylisopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl itaconate, dibutyl itaconate, vinyl pyridine, maleic anhydride, alkyl glycidyl ether and other unsaturated aliphatic ethers described in U.S.P. 2,160,943. These compounds may be described as vinyl or vinylidene compounds having single "$CH_2=C$" group. The most useful ones fall within the general formula $CH_2=C-R-X$ where R may be hydrogen, a halogen, or a saturated aliphatic radical and X is selected from one of the following groups: $-Cl$, $-Br$, $-F$, $-CN$, $-C_6H_5$, $-COOH$ and $-COOR'$, $-COR'$, $-COH$, $-OC_6H_5$, $-CONH_2$, $-CONH-R'$, and $-CONR_2'$ in which R' is alkyl.

The aqueous medium, in which the mixture of vinylidene chloride and at least one other polymerizable mono-olefinic monomer copolymerizable therewith is emulsified prior to polymerization, normally contains also a polymerization-promoting catalyst (initiator) and also an activator for the catalyst. Ammonium persulfate and sodium meta-bisulfite may be mentioned as examples of a polymerization-promoting catalyst and activator respectively. Ferrous ammonium sulfate is often added as an accelerator.

There may be used as the dispersing and stabilizing agents the alkali metal and ammonium sulfates such as sodium lauryl sulfate, sodium cetyl sulfate, etc. There may be used as the part of the stabilizing agent the alkali and ammonium alkyl aryl sulfonates such as sodium dodecyl toluene mono-sulfate and sodium dodecyl benzene sulfonate. Additionally, the alkali metal and ammonium alkyl aryl sulfonates applicable as a part of the stabilizing system may be those such as sodium isopropyl naphthalene sulfonate, sodium beta-naphthalene monosulfonate and the sodium salt of the condensation product of naphthalene sulfonic acid and formaldehyde.

When improved anchorage of the coating to a hydrophilic base sheet is a desideratum, the polymerization charge may include an ethylenically unsaturated acid or acid anhydride such as citraconic acid or citraconic anhydride, or mesaconic acid; or a mixture of acid anhydrides comprising citraconic anhydride and itaconic anhydride obtainable from citric acid by distillation, and also itaconic acid and itaconic anhydride, and acrylic acid, methacrylic acid, and methyl methacrylic acid in amounts of from 0.1% to 25% by weight of the total monomer charge (see U.S.P. 2,570,478, Pitzl).

Similarly, since it is desirable to prevent or inhibit the corrosion of metal surfaces, particularly chromium surfaces, when brought into contact with aqueous dispersions of the vinylidene chloride copolymers, hydrogen peroxide, 0.1% to 1.0% by weight, based on the total weight of the dispersion, may be added to the dispersion as described and claimed in U.S.P. 2,744,080, Brant.

In the treatment of base films to anchor thereon the vinylidene chloride copolymers, one or more known anchoring agents may be applied to the base film. For example, in the treatment of regenerated cellulose base film in accordance with this invention, one or more synthetic thermosetting aldehyde resins may be used, such as disclosed in U.S.P. 2,159,007, Charch et al.; U.S.P. 2,280,829, Jebens; U.S.P. 2,394,009, Pollard; U.S.P. 2,432,542, Pitzl; U.S.P. 2,523,869, Ellis; U.S.P. 2,533,557, Chapman; U.S.P. 2,546,575, Wooding, etc. in sufficient concentration to provide from 0.05% to 10% by weight of resin on the base film (dry basis). Other types of anchoring mediums which are equally applicable for use within the scope of the present invention are those such as titanium reaction products described in U.S.P. 2,768,909, Haslam, and U.S. patent applications Serial Nos. 652,376, filed April 12, 1957, now U.S.P. 3,002,854; 652,375, filed April 12, 1957, now U.S.P. 3,017,282; 520,135, filed July 5, 1955; and 480,800, filed February 12, 1955, now abandoned; polyisocyanates and polyurethanes having isocyanate end groups such as described in U.S.P. 2,284,896, Hanford et al., and U.S.P. 2,430,479, Pratt et al.; and polyimines such as described in U.S.P. 2,784,116, Lakotoes et al., and German Plastics Industry, 1946, pages 223–224.

The following example will serve to further illustrate the principles and practice of our invention. In the example, parts and percentages are by weight unless otherwise indicated.

Example 1

An aqueous dispersion of a copolymer of vinylidene chloride, methyl acrylate and itaconic acid was prepared according to the following formula:

| | Parts |
|---|---|
| Water | 286 |
| "Duponol" WAQ[1] (30% water solution) | 10 |
| Itaconic acid | 3 |
| Methyl acrylate | 18 |
| Vinylidene chloride | 282 (93.2 mol percent) |
| Ammonium persulfate | [2] 0.6 |
| Meta-sodium bisulfite | [2] 0.3 |
| Ferrous ammonium sulfate | [2] 0.0075 |

[1] Sodium lauryl sulfate.
[2] Added separately as solution in 2-3 parts water. This water deducted from initial quantity.

The dispersion was prepared by placing these ingredients in the order indicated into a vessel fitted with a reflux condenser. The mixture refluxed maintaining the temperature between 32° C. and 36° C. as polymerization progressed. The mixture was stirred until refluxing ceased, whereby indicating the completion of copolymerization. Upon completion of the reaction, a solution of:

| | Parts |
|---|---|
| "Duponol" WAQ[1] | 10 |
| "Daxad" 11[2] | 1.2 |
| "Santomerse 3"[3] | 8 |
| Water (dissolution) | 12.5 |
| Hydrogen peroxide | 2.5 |
| Ethylene glycol | 168 |

[1] Sodium lauryl sulfate.
[2] Sodium beta-naphthalene sulfonate condensed with formaldehyde.
[3] Sodium salt of an alkyl benzene sulfonate-75% active ingredient.

was added to stabilize the copolymer. The resulting dispersion was cooled and discharged through a filter. This dispersion contained approximately 39.5% solids and 21% ethylene glycol.

A thin film of the dispersion was spread out on a silver chloride substrate and tested with an infrared spectrophotometer in the manner described above. Results for the dispersion are—

| Dispersion age (days): | Time,[1] (min.) |
|---|---|
| Less than 1 | 51 |
| 2 | 46 |
| 3 | 35 |
| 5 | 29 |
| 6 | 18 |
| 11 | 13 |
| 25 | 4 |

[1] Required for crystallinity band to appear.

After the dispersion had aged for 3 days, the time for the crystallinity absorption band to appear was 35 minutes; thus the dispersion was considered to be in a usable condition for producing the satisfactory coatings, other conditions in proper relationship.

Subsequently, the dispersion at 20° C. was coated on a regenerated cellulose film 0.0008 inch thick. The film was dried in air at 135° C. to remove the aqueous dispersion to a moisture level of not greater than 14%, in this case 6.5%, and to promote crystallinity, and then passed over cold water chilled rolls at 20° C. cooling the film to 25° C. and wound into a mill roll. Approximately 12 hours later the mill roll was rewound, and the film exhibited no evidence of sticking or blocking. By the term "sticking" it is meant that when the wound roll of coated film is rewound if an audible ripping or tearing noise is heard "sticking" has occurred. By the term "blocking" it is meant that if the coated film sticks to the extent that the coating is torn from the base film or the entire film damaged during rewinding, "blocking" has occurred.

For purposes of comparison and to more clearly illustrate the present invention, the dispersion (aged 3 days) was coated on a second sheet of regenerated cellulose film in the manner described above. Again, the film was dried to a moisture level of 6.5% and then passed over (cold water chilled) rolls at 40° C. cooling the film to approximately 47° C. and wound into a mill roll. Approximately 12 hours later, the mill roll was removed, and the film exhibited severe sticking and blocking. The coating thus was impaired, and the film was thus rendered unsuitable for use in the trade.

As a further comparison regenerated cellulose film was coated with dispersions that had been aged 1 and 2 days with the crystallinity absorption band appearing at 50 and 44 minutes, respectively. The coated films were dried to a moisture content of 6.5% and then cooled to 25° C. In each case blocking the mill roll resulted.

After the dispersion had been aged for 20 days and the crystallinity absorption band appeared within less than 6 minutes, attempts were made to coat the regenerated cellulose film. However, the dispersion had become excessively crystalline and the particle growth too large to permit coherent film formation as evidenced by the moisture permeable, improperly coalesced coating. The so-deposited solids were found to be hazy and somewhat granular in appearance.

We claim:

1. The process which consists essentially in (1) coating a flexible, non-fibrous base sheet of organic polymeric material with an aqueous dispersion of particles of a copolymer of vinylidene chloride and at least one other mono-olefinic monomer copolymerizable therewith, said copolymer containing at least 92.5 mol percent of vinylidene chloride, said dispersed copolymer particles being in such condition that an infrared absorption band at about 13.3 microns appears within the time period of not less than 6 minutes and not greater than 35 minutes after casting said dispersion into a self-supporting film; (2) heating the coated base sheet to coalesce the coating and dry the coated sheet to a moisture content not greater than 14% by weight; and (3) substantially immediately cooling the dried, coated base sheet to a temperature no higher than 25° C.

2. The process of claim 1 wherein the base sheet is regenerated cellulose film.

3. The process which consists essentially in (1) coating a flexible, non-fibrous base sheet of organic polymeric material with an aqueous dispersion of particles of a copolymer of vinylidene chloride and at least one other mono-olefinic monomer copolymerizable therewith, said copolymer containing at least 92.5 mol percent of vinylidene chloride, said dispersed copolymer particles being in such condition that an infrared absorption band at about 13.3 microns appears within the time period of not less than 25 minutes and not greater than 35 minutes after casting said dispersion into a self-supporting film; (2) heating the coated base sheet to coalesce the coating and dry the coated sheet to a moisture content of from 5.5% to 8% by weight; and (3) substantially immediately cooling the dried, coated base sheet to a temperature no higher than 25° C.

4. The process of claim 3 wherein the base sheet is regenerated cellulose film.

5. The process which consists essentially in (1) coating regenerated cellulose film with an aqueous dispersion of particles of a copolymer of vinylidene chloride, methyl acrylate and itaconic acid, said copolymer containing at least 92.5 mol percent of vinylidene chloride, said copolymer particles being in such condition that an infrared absorption band at about 13.3 microns appears within the time period of not less than 6 minutes and not greater than 35 minutes after casting said dispersion into a self-supporting film; (2) heating the coated film to coalesce the coating and dry the coated film to a moisture content not greater than 14% by weight; and (3) substantially immediately cooling the dried, coated film to a temperature no higher than 25° C.

References Cited in the file of this patent

UNITED STATES PATENTS

| | | |
|---|---|---|
| 2,541,167 | Pitzl | Feb. 13, 1951 |
| 2,570,478 | Pitzl | Oct. 9, 1951 |
| 2,684,919 | Berry et al. | July 27, 1954 |
| 2,721,150 | Grantham | Oct. 18, 1955 |
| 2,870,038 | MacIntyre | Jan. 20, 1959 |
| 2,889,806 | Conant | June 9, 1959 |
| 2,955,958 | Brown | Oct. 11, 1960 |